May 30, 1939. A. H. HABERSTUMP 2,160,016
VEHICLE SEAT
Filed May 3, 1934 3 Sheets-Sheet 1
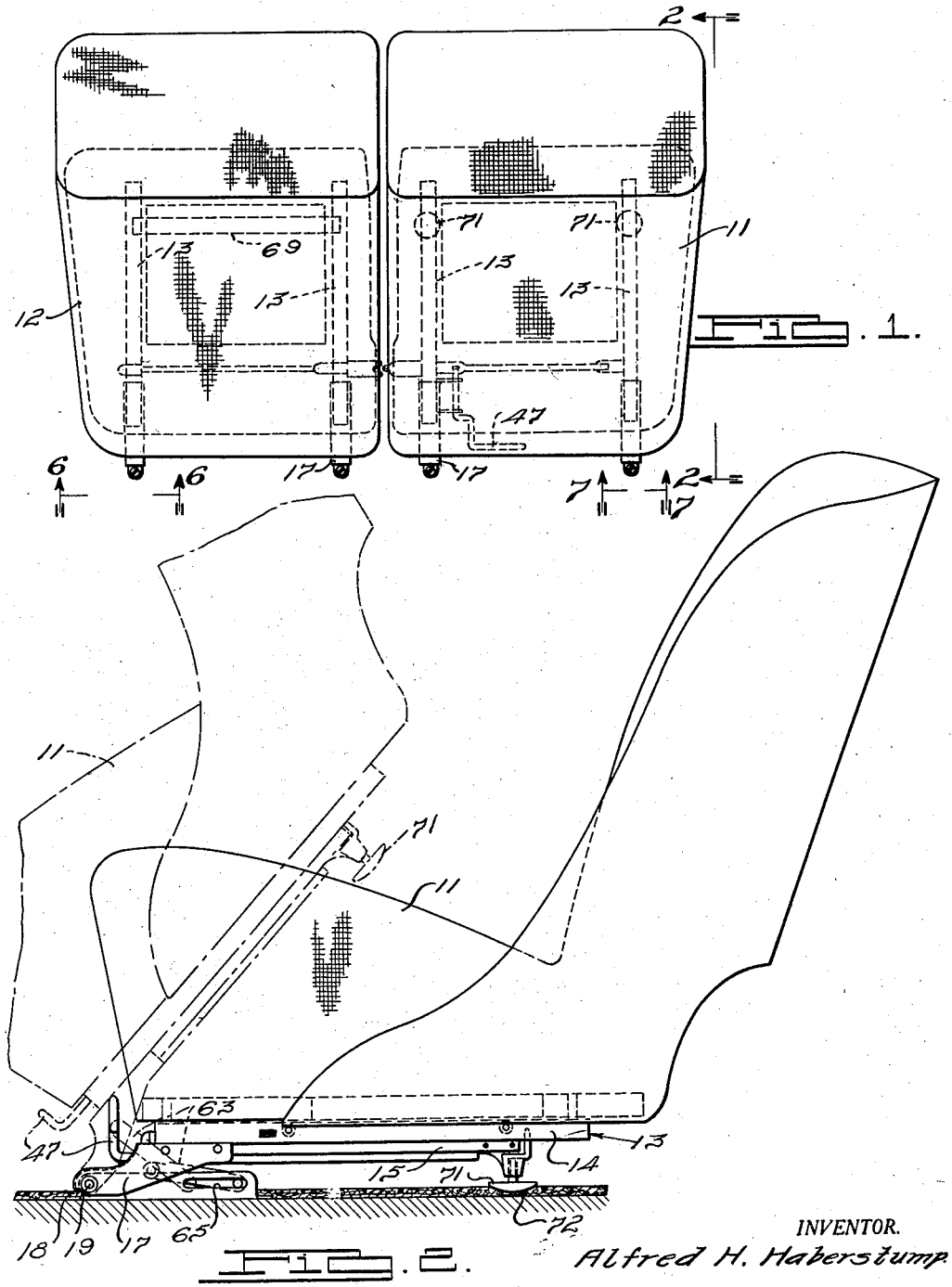
INVENTOR.
Alfred H. Haberstump
BY
Harness, Dickey, Pierce & Hann.
ATTORNEYS.

May 30, 1939.  A. H. HABERSTUMP  2,160,016
VEHICLE SEAT
Filed May 3, 1934  3 Sheets-Sheet 2
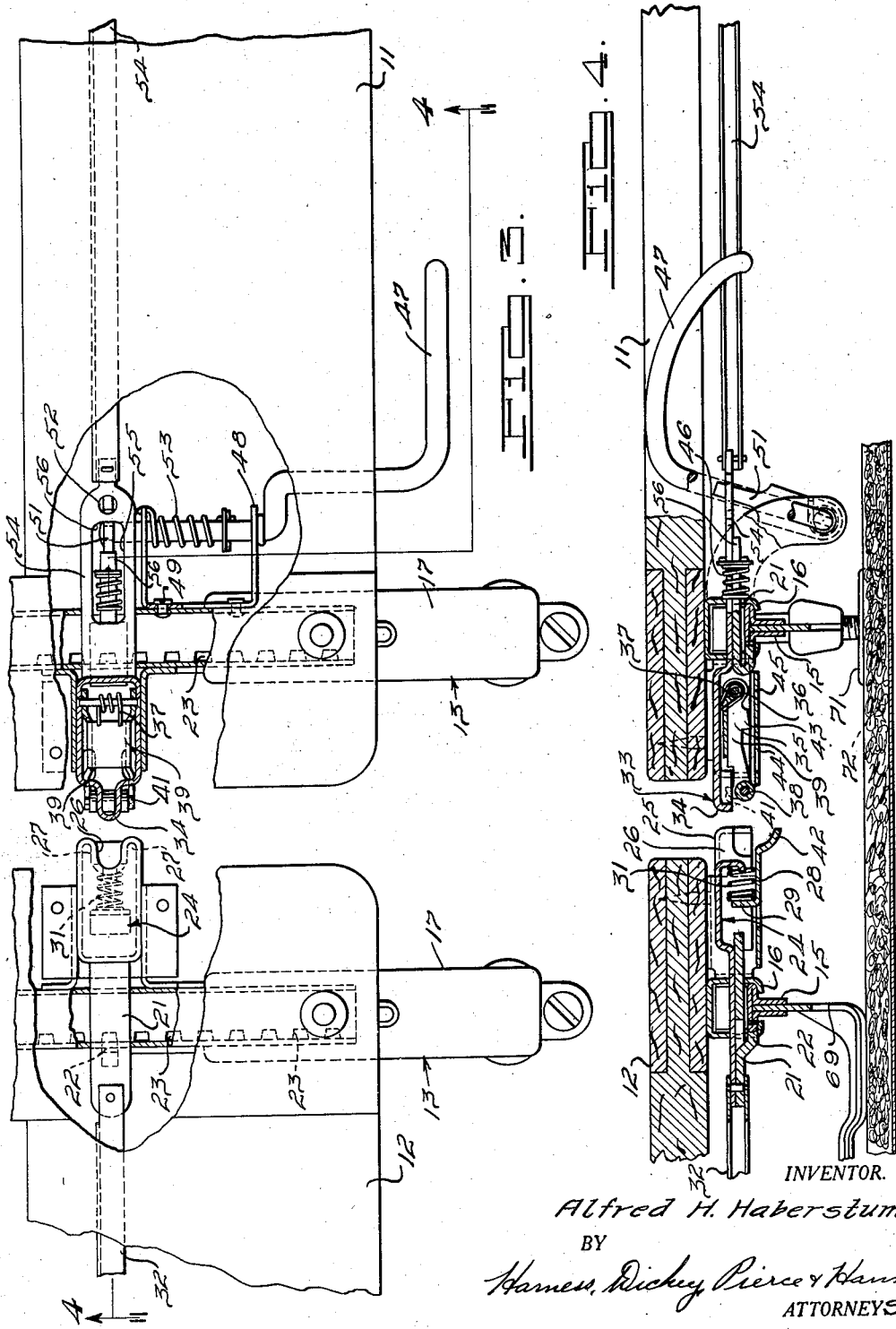
INVENTOR.
Alfred H. Haberstump.
BY
Harness, Dickey, Pierce & Haun.
ATTORNEYS.

May 30, 1939.  A. H. HABERSTUMP  2,160,016
VEHICLE SEAT
Filed May 3, 1934   3 Sheets-Sheet 3
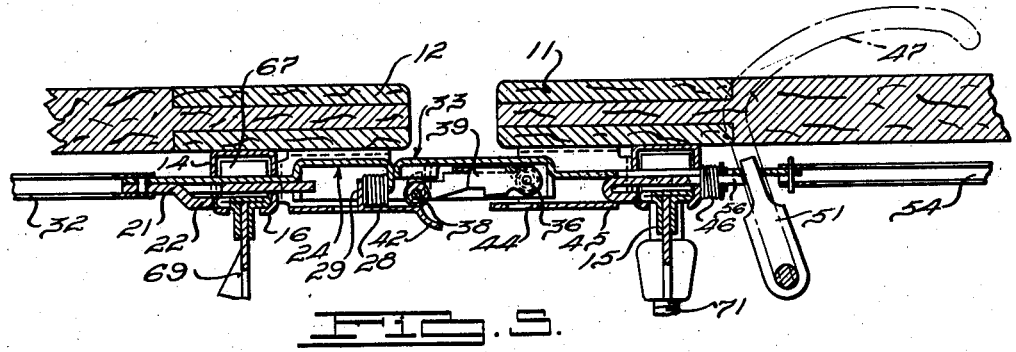
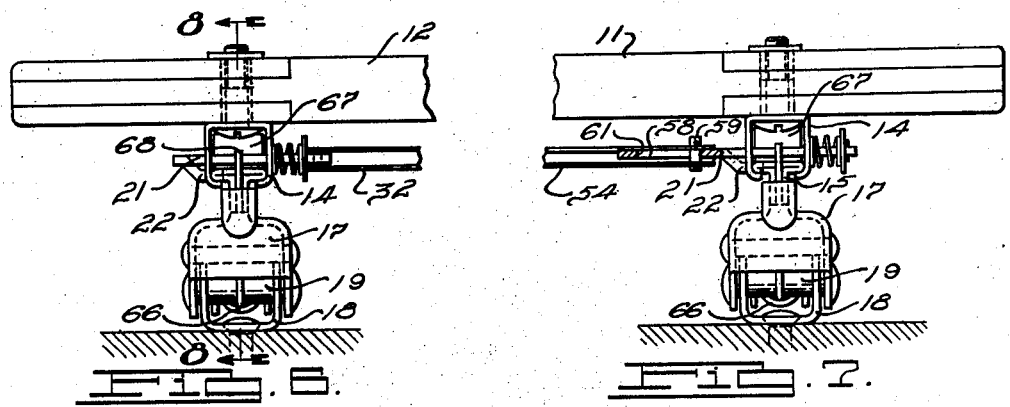
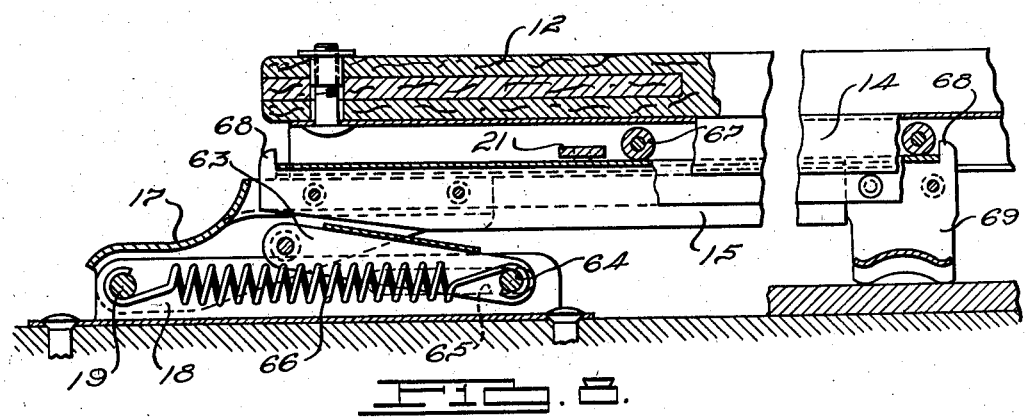
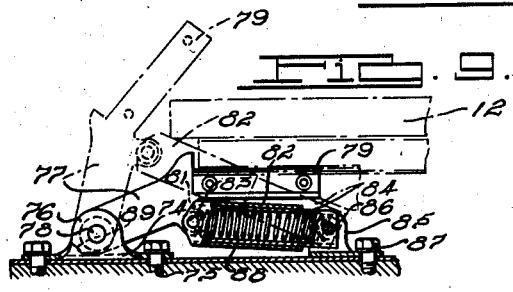
INVENTOR.
Alfred H. Haberstump.
BY
Harness, Dickey, Pierce & Hann.
ATTORNEYS.

Patented May 30, 1939

2,160,016

UNITED STATES PATENT OFFICE 2,160,016

VEHICLE SEAT

Alfred H. Haberstump, Detroit, Mich., assignor to The Murray Corporation of America, a corporation of Delaware Application May 3, 1934, Serial No. 723,658

9 Claims. (Cl. 155—14)

My invention relates to vehicle seats and particularly to a split seat of the unit type which is adjustable as a unit and has the sections so disposed as to be tiltable independently of each other.

Heretofore separate seats in vehicles have been tiltable independently of each other and have been independently adjustable. However such seats have never been formed into a unit so that a third person could occupy the central abutting portion of each of the seats, nor have both of the seats been heretofore adjusted in unison to retain them in aligned position with each of the seats tiltable to provide increased space between the seat and the door frame of the vehicle body.

In my copending application Serial No. 701,741, filed December 11, 1933, and assigned to the assignee of the present invention, I have illustrated several types of constructions wherein a unit seat is formed of two sections which are movable independently of each other and adjustable in unison. In that construction a frame was provided upon which the seat sections operated independently to provide clearance at the door opening and were retained in alignment by the frame which was adjustable. While the present invention need not be considered an improvement over the construction disclosed therein, another form in herein illustrated and described which, in certain applications, is more desirable in view of the cheapness of construction and its ready adaptability to particular types of vehicle bodies.

Each of the seats has supporting tracks mounted directly thereon, the front ends of the tracks being secured to a pivot on the floor of the vehicle. Each of the seat sections is tiltable about the pivot to provide space between the seat and the door jamb for the entrance of passengers into the rear vehicle compartment. Each of the seat sections is independently locked to the tracks so they will not be shifted while tilted. A unique locking mechanism is provided for the seat sections which, as pointed out hereinabove, locks each of the sections to the pair of tracks. Interrelated mechanism must first be moved into engagement to lock the sections in aligned position before the locks for the sections are released. In this manner, the shifting of the seat sections relative to the steering apparatus is effected in unison, and their release occurs after the sections are again locked in position.

After adjustment, each of the seat sections will be locked in fixed position relative to the pivot and will be retained in aligned position with each other so that either may be tilted without affecting the alignment. By having the tracks pivoted to the front end of the seat and carried entirely by the seat, the tilting of the seat leaves the floor clear in the area at the opening between the seat and door jamb. Adjusting mechanism may be provided on the rear end of the tracks to position the seat relative to the pivot, or frame mechanism may be employed cross-bracing the rear end of the tracks and preventing the seat from skewing when one is occupied during the adjustment of the seat sections as a unit.

Accordingly, the main objects of my invention are: to provide a unit seat made of two individual sections which are mated together to substantially eliminate the space therebetween; to provide each seat section of a unit seat with a pair of supporting tracks upon which the seats are adjusted longitudinally of the vehicle; to secure the tracks to the floor of the vehicle by pivots which fixes one element of the track relative to the floor; to provide locking mechanism for each seat section, portions of which are so inter-related that they must be engaged before the locks for the individual sections will be released to have the adjustment of the seat sections occur simultaneously and when in alignment; to provide locking mechanism for each seat section which is so disposed that neither seat may be unlocked when the other is in tilted position; and in general to provide seat sections forming a unit seat which are supported on mechanism for permitting the tilting of each individual section and the unit operation of the sections in aligned relation which is simple in construction, positive in operation and economical of manufacture.

Other objects and features of the novelty of my invention will be either specifically pointed out or will become apparent when referring, for a better understanding of my invention, to the following description taken in conjunction with the accompanying drawings, wherein:

Figure 1 is a plan view of a unit seat embodying features of my invention,

Fig. 2 is an enlarged side view of the structure illustrated in Fig. 1,

Fig. 3 is an enlarged broken plan view of the front central portion of the unit seat illustrated in Fig. 1 with parts in section, Fig. 4 is a sectional view of the structure illustrated in Fig. 3, taken on the line 4—4 thereof, Fig. 5 is a broken view of structure, similar to that illustrated in Fig. 4, with the aligning mechanism in engaged position, Fig. 6 is an enlarged sectional view of structure illustrated in Fig. 1, taken on the line 6—6 thereof, Fig. 7 is an enlarged sectional view of the structure illustrated in Fig. 1, taken on the line 7—7 thereof, Fig. 8 is an enlarged sectional view of the structure illustrated in Fig. 6, taken on the line 8—8 thereof, and Fig. 9 is a view of structure, similar to that illustrated in Fig. 8, showing a modified form thereof.

Referring to Fig. 1, a left hand seat section 11 and a right hand seat section 12 are illustrated having the inner edge in closely engaged position following substantially the same contour to form a unit seat construction wherein the central portion, at the central abutting edges, may be occupied by a third person. The seat construction follows that in the above mentioned co-pending application and will not be described herein in detail. The right and left hand reference to the seat sections is that from a body as viewed from the rear and not as shown in the drawings.

Each of the seat sections 11 and 12 is mounted on a pair of track elements. Each of the track elements 13 is made of a channel element 14 which is secured to the seat and a T-shaped joining element 15 which is secured thereto and retained against lateral displacement by inwardly extending flanges 16, as illustrated in Figs. 4 and 5. The track is of conventional form and may be composed of any mated elements which will operate longitudinally of each other, any number of which are known in the art to be suitable.

Each of the T-shaped elements 15, or, in other words, the track elements operable in the elements secured to the seat, is provided with a foot 17 which is secured to a bracket 18 by pivots 19. The pivoting of the foot 17 on the pivot 19 permits the tilting of each of the seat sections to permit entrance to the vehicle. Each of the channel elements 14 is provided with a laterally movable plate 21 having a projection 22 which is engageable in any of a plurality of notches 23 provided in the track portions 15. The seat sections are secured in this manner in locked position to each of the pair of tracks, against longitudinal movement relative to the vehicle.

To effect the unlocking of the seats to move them when aligned and for retaining them at all times aligned when the seats are unlocked, I have provided a unique construction which will now be described in detail. The plate 21 on the left hand track of the right hand seat 12 has an element 24 secured thereto having a housing 25 on the end which is downwardly presenting and has formed in the end an outwardly presenting recess 26. The plate 21 could be omitted and the element 24 made thicker and provided with the projection 22. On either side of the recess 26 recesses 27 are provided which are downwardly presenting. The housing 25 is slidably guided in a channel-shaped bracket 28 having an upstanding flange 29 engaging one end of the spring 31 which abuts against the housing 25 to provide a lateral bias to the plate 21 urging it to locked position. The elements 21 and 24 are secured to a cross link 32, the other end of which is secured to the plate 21 at the left hand side of the seat.

Slidably mounted on the plate 21 on the right hand side of the left hand seat, I have provided a housing 33 having a sidewardly extending finger 34 which mates with the recess 26 provided in the housing 25. A channel-shaped latch 35 is mounted in the housing 33 on a pivot 36 about which a spring 37 is secured for urging the latch downwardly. At the front end of the latch 35 a roller 38 is provided on spaced arms 39 the upper portion of which are provided with locking projections 41. The projections 41 are disposed within the recesses 27 when the latch is moved upwardly as the roller engages a projecting tongue 42 of the bracket 28 to lock the projections 41 within the recesses. The latch 35 is provided with a downwardly extending lug 43 mateable in a slot 44 in a bracket 45 which encompasses the housing 33 and is secured to the bottom of the seat. A spring 46 is disposed over the rear end of the plate 21 for urging the plate to the left to lock the track elements in fixed relation.

An operating handle 47 is mounted on the right hand channel element 14 of the left hand seat, being supported thereon by a bracket 48 which is riveted to the channel by rivets 49. The handle is provided with an arm 51 which projects through an aperture 52 in the extension of the housing 33 for moving the housing to the right when the handle is raised. A spring 53 is provided on the handle shaft for the purpose of returning the handle to normal position, moving the housings 33 and 24 out of mated relation. A link 54 interconnects the extension of the housing 33 to the plate 21 on the left hand side of the left hand seat to thereby have all of the plates 21 interconnected to be operated by a movement of the handle.

Upon the actuation of the handle upwardly, the arm 51 likewise moves upwardly, forcing the housing 33 to the right as viewed in the figure. When the seats are both in position to be occupied and in aligned relation, the movement of the housing 33 will cause its projecting end 34 to move into the recess 26 in the housing 24, to secure the seats in aligned relation. Further movement of the handle will cause the roller 38 to engage and move along the tongues 42 to have the projections 41 of the arms 39 move into the recesses 27 of the housing 24 to thereby lock the end 34 in the recess 26. Further movement of the handle moves all of the plates 21 toward the right of the body, to unlatch the track elements 14 and 15 relative to each other to permit the seat sections to be adjusted in unison. Adjustment must occur, therefore, in unison and, after the seats are in adjusted position. The release of the handle will first cause the projections 22 on the plates 21 to move into a notch 23 to lock all of the tracks in adjusted position. Further movement withdraws the projections 41 from the recesses 27 and the housing 33 from contact with the housing 24 so that either of the seats may be tilted without interference with the latching mechanism.

When it is attempted to operate the handle 47 when either one of the seats are tilted, the projections 43 on the latch 35 will drop into the notches 44 and will prevent any further movement of the housing 33 on the plate 21 to thereby prevent the release of the projections 22 and the independent adjustment of the seat sections. A projection 54 of the housing 33 is provided with an elongated aperture 55 in which the spring 46 is nested and which permits the initial movement of the plate 54 and the housing 33 before the arm 51 engages the end 56 of the plate 21 to force it to the left. A slot 58 is provided in the plate 21 on the left hand side of the left hand seat in which a rivet 59 is movable a predetermined amount before engaging the end 61 of the slot to move the plates 21 and release the tracks. Before the movement of the plates 21 on the left hand seat section is effected by the arm 51 and the rivet 61, the projections 43 of the latch 35 will drop into the slots 44 and prevent further movement of the handle when the roller 38 does not engage the tongue 42. In this manner, the seat sections must be aligned before they can be released to be shifted in unison. The locked position of the elements is illustrated in Fig. 5. The elements have been moved to have projections 22 move from the slots 23 to release the track elements so that in this position the seats are unlocked and latched in aligned position ready to be adjusted.

In Fig. 8 I have shown a unique balancing device for assisting in raising and counter-balancing the seat sections and for retaining the sections in raised position. The foot 17 is of channel shape and encompasses the channel-shaped bracket 18 and pivot 19. Nested within the two channel elements is a third channel element in the nature of a link 63 which is pivoted to the foot 17. A pivot 64 is provided at the opposite end of the link projecting into slot 65 provided in the channel bracket 18. A spring 66 interconnecting the pivots 64 and 19 provides energy, acting through the link 63, to balance the seat. It will be noted in the figure that the spring is of greater tension when the seats are down but, in view of the position of the link 63 relative to the foot 17, less pressure is exerted for raising the seat than will be available when the spring is partially contracted and the link 63 disposed at a less angle to the foot 17, as illustrated in Fig. 2. In this position sufficient force is exerted by the spring to retain the seat in raised position.

The rollers 67, provided in the channel element 14 of the track, engage the upwardly projecting tongues 68 on the track portion 15, when moved backwardly, to limit the rearward movement of the seat sections. The plates 21 engage the tongues 68 at the front of the seat sections to limit the forward movement of the sections. The tracks may be interconnected at the rear end by a cross brace 69 which rests upon the floor of the vehicle and is movable with the seat sections when tilted. The brace adds rigidity to the construction to prevent any twisting of the seats out of line when they are unlocked and shifted.

It will be noted in Fig. 4 that on the left hand seat section I have provided adjustable feet 71 which regulate the seat sections relative to alignment and which may be disposed in a recess 72 provided in the floor of the vehicle for likewise preventing the horizontal twisting movement which may be set up in the sections when being shifted when locked in aligned relation. It is to be understood that the bracket 69 may be employed on one seat and the feet 71 on the other or the bracket may be used on both seats or the feet 71 may be substituted for the bracket on the left hand seat. Any of the constructions, when employed as shown, will operate in a satisfactory manner to effect the proper movement of the seats to adjusted position.

In Fig. 9 I have shown a modified form of balancing device in which a compression spring is employed rather than a spring which is tensioned when elongated as in Fig. 8. A foot 74 is secured to the floor by a bolt 75 having extending bosses 76 between which a seat supporting arm 77 is pivoted on a pin 78. The arm 77 is extended at 79 to be secured to the track in the same manner as the foot 17 of Fig. 8. A projecting boss 81 is provided on the arm 77 having a tube 82 pivoted thereto by a pin 83. A tube 84 is telescoped within the tube 82 having its outer end secured to a bracket 85 by a pin 86. The bracket is secured to the floor of the vehicle by a suitable bolt or the like 87. A coil spring 88 of the compression type is disposed within the tubes 82 and 84, abutting against the pins 83 and 86 in a position to expand if the seat is raised to exert energy for assisting in the raising operation and to retain the seat in forward tilted position. When the seat is resting on the floor, the spring between the pins 83 and 86 exerts no pressure in view of the aligned relation of the pin with the pin 78. An increasing amount of pressure is exerted as the spring expands, because of the decreased angularity of the tubes 82 and 84 relative to the arm 77, approaching a right angle from a straight angle position. The spring exerts its greatest force when a right angular relation obtains between the tube 82 and arm 77 so that a greater pressure is exerted when less force is present in the spring due to the relation of the elements.

While I have disclosed the balancing mechanism for the seat as being incorporated in the adjusting mechanism for the seat, it is to be understood that the balancing mechanism could be a separate element secured directly to the underside of the seat and floor to effect the balancing operation. However, applicant is interested in having the balancing device, the tilting pivots and the longitudinal adjusting mechanism as well as the control handle. It is only necessary to secure the mechanism as a unit to the floor of the vehicle and to the bottom of the seat to have all of the desirable operating features, specified above, present in the seat. This is a material saving in labor and time of assembly over constructions employing the operating handle, the tracks, the pivot and the balancing device as separate elements, separately secured to the seat and floor. A flat portion 89 may be provided on the front end of the arm 77 beyond the pivot 78 which contacts the bottom of the foot 74 to provide a stop for limiting the forward tilting movement of the seat section.

While I have described and illustrated but a single embodiment of my invention, it will be apparent to those skilled in the art that various changes, omissions, additions and substitutions may be made therein without departing from the spirit and scope of my invention, as set forth in the accompanying claims.

I claim as my invention:

1. A unit seat for a vehicle body which is split interjacent its sides to form two portions, means for supporting said portions for movement longitudinally of the body including means for supporting each of the portions tiltable independent of the other, and means preventing the longitudinal movement of either seat portion when one is tilted.

2. A unit seat for a vehicle body which is split interjacent its sides to form two portions, means for supporting said portions for movement longitudinally of the body including means for supporting each of the portions tiltable independent of the other, means normally latching said portions against longitudinal movement and means for releasing said latching means effective to lock said portions in aligned relation before said latching means are released.

3. A unit seat for a vehicle body which is split interjacent its sides, a plurality of relatively movable track elements one portion of each of which is secured to the underside of each of said seat portions to support the seat portions for movement longitudinally of the body, pivots securing another portion of the track elements to the floor of the body to have each seat portion tiltable independent of the other, locking means for said track elements, operating means for said locking means, means for interconnecting the operating means with all of the locking means whereby they may be operated in unison, and means on said interconnecting means for latching the seat portions in aligned relation before the latching means are operated.

4. A unit seat for a vehicle body which is split interjacent its sides, a plurality of relatively movable track elements one portion of each of which is secured to the underside of each of said seat portions to support the seat portions for movement longitudinally of the body, pivots securing another portion of the track elements to the floor of the body to have each seat portion tiltable independent of the other, locking means for said track elements, operating means for said locking means mounted on said track elements, means for interconnecting the operating means with all of the locking means whereby they may be operated in unison, means on said interconnecting means for latching the seat portions in aligned relation, and means for preventing the release of the locking means until the interconnecting means is latched.

5. Two aligned seat portions, means slidably and tiltably mounting each portion, independent means locking each portion against sliding movement, and releasing mechanism including parts on each portion interengaging upon the actuation of the releasing mechanism to lock the portions together for movement as a unit.

6. A vehicle seat construction comprising a pair of transversely aligned mated seats, trackways on the floor of the vehicle serving to support said seats and permit longitudinal movement thereof, pivotal connections interconnecting each of said trackways with the vehicle in which they are mounted whereby said seats may be bodily tilted independently of each other, means for locking said seats against longitudinal movement, and release mechanism co-operating with said locking means to unlock the same only when said seats are arranged in aligned untilted position.

7. A unit seat for vehicle bodies, said seat being split to provide two mating seat portions, trackways for mounting each of said seat portions for longitudinal movement, catches for each of said seat portions cooperating with the trackways thereof for locking the seat portions against longitudinal movement, pivotal connections interconnecting said trackways with the floor of the vehicle providing means whereby said seat portions may be independently tilted, and latch means for interconnecting said seat portions for longitudinal movement as a unit, upon release of said catches said latch cooperating with said catches and serving to release the same.

8. A unit seat for vehicle bodies, said seat being split to form two mating seat portions, trackways for mounting each of said seat portions for longitudinal movement, pivotal connections for each of said seat portions connecting the same with the floor of the vehicle and providing for independent tilting of said seat portions, means individual to each of said seat portions cooperating with said trackways for locking said seats against longitudinal movement, and release mechanism common to both of said seat portions cooperating with said locking means serving to simultaneously release the same and lock said seats together for movement as a unit.

9. A unit seat for vehicle bodies, said seat being split to provide two mating seat portions, trackways individual to each of said seat portions serving to mount the same for longitudinal movement, catches for each of said seat portions cooperating with the trackways thereof for locking the seat portions against longitudinal movement, each of said trackways being pivotally connected with said vehicle body whereby said seat portions may be tilted independently of each other, latch means for interconnecting said seat portions for longitudinal movement as a unit, means operatively interconnecting said latch means with said catches to effect release of said catches upon engagement of said latch means.

ALFRED H. HABERSTUMP.